United States Patent
Bridgewater et al.

(10) Patent No.: US 6,294,125 B1
(45) Date of Patent: Sep. 25, 2001

(54) METHOD FOR CHANGING THE DIELECTRIC PROPERTIES OF A CERAMIC MATRIX COMPOSITE

(75) Inventors: Todd Jeffery Bridgewater, Kawkawlin; Daniel Ralph Petrak, Sanford; Andrew Szweda, Midland, all of MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/220,172

(22) Filed: Dec. 23, 1998

(51) Int. Cl.[7] .................................................. C04B 33/32
(52) U.S. Cl. .................... 264/400; 264/430; 264/434; 264/624; 264/629; 264/640; 264/641; 264/653; 264/662; 264/678; 264/261; 264/340
(58) Field of Search ..................... 264/400, 430, 264/434, 624, 629, 640, 641, 653, 662, 678, 261, 340

(56) References Cited

U.S. PATENT DOCUMENTS

| | | | |
|---|---|---|---|
| 4,983,422 | 1/1991 | Davis et al. | 427/228 |
| 5,198,302 | 3/1993 | Chyung et al. | 428/375 |
| 5,279,780 | 1/1994 | Lipowitz et al. | 264/82 |
| 5,318,930 | 6/1994 | Leung et al. | 501/32 |
| 5,601,674 | 2/1997 | Szweda et al. | 156/89 |
| 5,660,624 * | 8/1997 | Dry | 106/677 |
| 5,707,471 | 1/1998 | Petrak et al. | 156/89 |
| 5,910,095 * | 6/1999 | Strasser et al. | 60/272 |

* cited by examiner

*Primary Examiner*—Christopher A. Fiorilla
(74) *Attorney, Agent, or Firm*—Catherine U. Brown; Sharon K. Severance

(57) ABSTRACT

A method for changing the dielectric properties of a polymer impregnated and pyrolyzed ceramic matrix composite (polymer impregnated and pyrolyzed ceramic matrix composite) is disclosed. The polymer impregnated and pyrolyzed ceramic matrix composite can be used in aircraft and turbine engines. polymer impregnated and pyrolyzed ceramic matrix composite comprises a ceramic matrix, a reinforcing fiber, and at least 1 additive used to change dielectric properties (dielectric constant and loss factor). The additive can be a low dielectric constant material having a dielectric constant in the range of 1 to 7.5. The low dielectric constant material can be an oxide such as silica or aluminosilicate or a non-oxide such as silicon nitride, boron nitride, or silicon carbide. The low dielectric constant material can be incorporated in the ceramic matrix as a filler. The low dielectric constant material may be incorporated in a uniform array of holes fabricated in the polymer impregnated and pyrolyzed ceramic matrix composite.

23 Claims, No Drawings

METHOD FOR CHANGING THE DIELECTRIC PROPERTIES OF A CERAMIC MATRIX COMPOSITE

FIELD OF THE INVENTION

This invention relates to a method for changing the dielectric properties of a polymer impregnated and pyrolyzed ceramic matrix composite (CMC). More particularly, this invention relates to a CMC with improved dielectric properties and a method for its fabrication. The CMC can be fabricated with a dielectric constant and loss tangent that permits it to be used in aircraft and turbine engines.

BACKGROUND OF THE INVENTION

U.S. Pat. No. 4,983,422 to Davis et al., Jan. 8, 1991, discloses a ceramic composite with a low dielectric constant and high mechanical strength. The composite is made from a liquid aluminum oxide precursor and a reinforcement fabric. The method for producing the ceramic composite comprises introducing the precursor into a reinforcement fabric, curing the precursor to set the desired geometry, and converting the cured precursor to an aluminum oxide ceramic by pyrolysis.

U.S. Pat. No. 5,198,302 to Chyung et al., Mar. 30, 1993, discloses a fiber reinforced ceramic matrix composite formed from a preform comprising silicon nitride fibers coated with boron nitride and alumina and a matrix material. When the preform is heated in an oxidizing atmosphere essentially free of water vapor, a composite with low dielectric loss and high strength is produced.

U.S. Pat. No. 5,318,930 to Leung et al., Jun. 7, 1994, discloses a fiber reinforced silicon carboxide composite with adjustable dielectric properties. The dielectric constants of the composites are adjusted by varying the reinforcing fibers and the carbon content of the black glass matrix.

U.S. Pat. No. 5,601,674 to Szweda et al., Feb. 11, 1997, discloses a method or making a fiber reinforced ceramic matrix composite that is oxidation stable. The method comprises heating a matrix mixture slurry interspersed about reinforcing fiber in an oxidizing atmosphere to yield a crystalline ceramic phase.

However, all of these composites contain oxide matrix materials, which suffer from the drawback of insufficient capability to retain mechanical strength at high process temperatures. One object of this invention is to provide a ceramic matrix composite that can withstand repeated exposure to high process temperatures (greater than 1,000° C.). A further object of this invention is to provide a ceramic matrix composite with low dielectric constant and loss factor, high mechanical strength, low observability, and low oxidation at high working temperatures in air.

SUMMARY OF THE INVENTION

This invention relates to a polymer impregnated and pyrolyzed ceramic matrix composite (CMC) having improved dielectric properties and a method for its fabrication. This invention further relates to a method of changing the dielectric properties of the CMC. The dielectric properties can be changed by incorporating at least 1 additive having dielectric properties different from the ceramic matrix and reinforcing fiber. The additive can be a filler incorporated in the ceramic matrix of the CMC. The additive can also be incorporated in the CMC by fabricating a uniform array of holes in the CMC, during or after the process of fabricating the CMC, and filling the holes with the additive.

DETAILED DESCRIPTION OF THE INVENTION

This invention relates to a polymer impregnated and pyrolyzed ceramic matrix composite (CMC) having improved dielectric properties, and a method for its fabrication. The CMC comprises A) a reinforcing fiber that is capable of retaining its mechanical strength after processing at temperatures greater than 1,000° C., B) a ceramic matrix, and C) an additive used to change the dielectric properties of the CMC.

U.S. Pat. No. 5,707,471 issued to Petrak et al. on Jan. 13, 1998, which is hereby incorporated by reference, discloses suitable reinforcing fibers and ceramic matrices, and methods for their preparation.

The reinforcing fibers that may be used in this invention are high-modulus fibers that are compatible with the interfacial coatings and ceramic matrices described herein. The fibers must be able to retain their mechanical strength after repeated process steps at temperatures of at least 1,000° C., preferably at least 1,300° C. These fibers are known in the art and are commercially available. Suitable fibers are disclosed in U.S. Pat. No. 5,707,471 and U.S. Pat. No. 5,279,780 to Lipowitz et al., Jan. 18, 1994, which is hereby incorporated by reference.

Examples of suitable fibers include silicon carbide, silicon nitride, silicon carbide deposited on a carbon core, aluminum borate, aluminum oxide, silicon oxide, silicon carbide containing titanium, silicon oxycarbides, silicon oxycarbonitrides, carbon, and the like. Silicon carbide fibers are preferred because they can withstand processing temperatures of 1,300° C. or greater. Generally, the fibers have a modulus greater than 100 GPa, preferably greater than 150 GPa. The fibers may contain any number of filaments per tow and typically have a diameter in the range of 5 to 500 micrometers.

Examples of specific fibers include NICALON® and HI-NICALON® fibers, which are silicon oxycarbide fibers with diameter of 10 to 20 micrometers manufactured by Nippon Carbon; SCS-6® fibers comprising silicon carbide deposited on a carbon core with diameter of about 143 micrometers, which are manufactured by Textron; NEXTEL® 312, NEXTEL® 440, NEXTEL® 480, NEXTEL® 610, and NEXTEL® 720 fibers, which are alumina-boria-silica fibers with diameters of 10 to 12 micrometers manufactured by 3M; $SiO_2$ fibers with diameter of 8 to 10 micrometers manufactured by J. P. Stevens; $Al_2O_3$—$SiO_2$ fibers with diameter of 9 to 17 micrometers manufactured by Sumitomo, TYRRANO® fibers, which are silicon carbide fibers containing titanium with diameter of 8 to 10 micrometers manufactured by Ube; and silicon carbide fibers with diameter of 6–10 micrometers manufactured by Textron.

The fibers can have interface coatings. Suitable interface coatings are disclosed in U.S. Pat. No. 5,707,471. Examples of interface coatings include carbon, boron nitride, a two-layer coating comprising silicon nitride on top of boron nitride, silicon carbide, silicon nitride, aluminum nitride, and combinations thereof. The interface coatings are typically 0.05 to 1.0 micrometers thick.

The fibers may be used in nearly any length and may be arranged in the ceramic matrix in nearly any manner desired to reinforce the CMC. The fiber reinforcement can have various forms. The fibers can be continuous or discontinuous. The continuous fibers may be woven into a 2-dimensional fabric or cloth using different weaves such as plain, satin, leno, and crowfoot. The fibers may also be shaped as a 3-dimensional pre-form. Other forms of continuous fiber reinforcement are exemplified by braids, stitched fabrics, and unidirectional tapes and fabrics.

Discontinuous fibers suitable for this invention include milled fibers, whiskers, chopped fibers, and chopped fiber mats. A combination of continuous and discontinuous fibers may be used in the CMC.

The ceramic matrix of the CMC is derived from a curable preceramic polymer. "Curable" means that the polymer can be deep section infusibilized (cured) in the composite under moderate conditions by means such as mild heat, radiation, curing catalysts, or curing agents. Curability inhibits the composite from delaminating during pyrolysis.

Curable preceramic polymers are known in the art and can be manufactured by known techniques, such as those disclosed in U.S. Pat. No. 5,707,471. Examples of suitable preceramic polymers include polysilazanes, polycarbosilanes, polysiloxanes, polysilanes, polymetallosiloxanes, and the like. Polysilazanes are preferred. Suitable polysilazanes include hydridopolysilazanes, vinyl-modified polysilazanes, silacyclobutasilazane, vinyl-modified poly(disilyl)silazanes, and borosilazanes. Preferred polysilazanes include boro-modified polysilazanes and vinyl-modified polysilazanes.

Other curable silicon-containing preceramic polymers can also be used in this invention. One skilled in the art would know how to select suitable curable preceramic polymers and methods for their preparation.

Curable preceramic polymers having a ceramic char containing at least 50 wt % silicon are preferred for the present invention. To determine the weight percent of silicon in the char, the curable preceramic polymer is heated in an inert atmosphere to a temperature of about 1,200° C. The resulting char is analyzed to determine the quantity of elements present and the weight percent of silicon is determined therefrom.

The additive used to change dielectric properties can be a filler or have any other convenient form. Fillers can be used in combination with other additives. The additive can be a high dielectric constant material or a low dielectric constant material. High dielectric constant materials typically have dielectric constants greater than 7.5. For example, silicon carbide is a high dielectric constant material having a dielectric constant of about 10.

The low dielectric constant material typically has a dielectric constant in the range of about 1 to 7.5. The low dielectric constant material is selected from the group consisting of air (which has a dielectric constant of about 1), oxides, and non-oxides. Suitable oxides typically have a dielectric constant in the range of 3.6 to 6.6. Examples of suitable oxides include silica, which has dielectric constant of 3.6 to 3.8, and aluminosilicates, such as mullite which has dielectric constant of about 6.6. The low dielectric constant material is preferably a non-oxide having a dielectric constant in the range of 4.0 to 7.5. Suitable non-oxides include silicon nitride, which has a dielectric constant of 6.5 to 7.5 and boron nitride, which has a dielectric constant of about 4.0.

Low dielectric constant materials used as fillers preferably have dielectric constants in the range of 5.5 to 7.5. Examples of suitable low dielectric constant fillers include silicon nitride, silicon carbide, and boron nitride. Silicon nitride is preferred. Typically, the filler comprises up to 70 wt % of the ceramic matrix, preferably 20 to 70 wt %, and more preferably 25 to 40 wt %. If the amount of filler in the ceramic matrix is less than 20 wt %, then the ceramic matrix will be highly cracked on processing. If the amount of filler in the ceramic matrix is more than 70 wt %, then it will be difficult to consolidate the CMC due to inadequate preceramic polymer content.

This invention further relates to a method for fabricating the CMC. The method comprises fabricating a CMC comprising a reinforcing fiber and a ceramic matrix. A uniform array of holes is fabricated in the CMC. At least 1 additive used to change the dielectric properties in the CMC can be added. However, the ceramic matrix of the CMC must have open porosity of 2 to 20 vol %.

The CMC can be fabricated by the method disclosed in U.S. No. Pat. No. 5,707,471. In a preferred embodiment of this invention, the composite can be fabricated by impregnating the reinforcing fiber with a matrix mixture comprising a curable preceramic polymer and optionally an additive (i.e., a filler) to form a pre-preg; and pyrolyzing the pre-preg to form a CMC having at least 1 additive used to modify dielectric properties incorporated therein.

The method of the present invention is performed under an inert atmosphere, where "inert" means containing less than 500 ppm oxygen. The inert atmosphere comprises nitrogen, argon, or helium. The inert atmosphere prevents formation of oxides from the curable preceramic polymer during processing.

Impregnating the reinforcing fiber with the matrix mixture can be performed, for example, by a solution route or a melt route. In the solution route, the matrix mixture is formed by mixing the curable preceramic polymer and any fillers used as additives in an organic solvent. The solvent preferably has a vaporization point lower than 125° C. at ambient pressure and preferably contains less than 1 wt % water. Examples of suitable organic solvents include aliphatic hydrocarbons, such as hexane and heptane, and aromatic hydrocarbons, such as toluene and benzene. The concentration of curable preceramic polymer in the solution is preferably 30 to 60 wt %.

In the melt route, the matrix mixture is formed by heating the curable preceramic polymer to a temperature above its melting point but below the temperature required to cure the curable preceramic polymer. Fillers used as additives may also be mixed in the molten polymer.

The reinforcing fibers are then impregnated with the matrix mixture by any convenient means. For example, the reinforcing fibers can be immersed in the matrix mixture, sprayed with the matrix mixture, held under a stream of the matrix mixture, or vacuum infiltrated with the matrix mixture. Following impregnation, the excess matrix mixture on the fibers is removed.

If the solution route was used, the solvent is then removed from the impregnated fibers. The solvent can be removed, for example, by allowing the solvent to evaporate in air under atmospheric conditions, by application of mild heat, or by use of vacuum. The impregnated fibers after solvent removal are commonly called a "pre-preg". The pre-preg may then be formed into a composite shape.

Thereafter, the composite shape may be fully cured or partially cured (B-staged) before pyrolysis. Curing allows the pre-preg to hold its shape during subsequent processing steps. Curing the pre-preg can be performed by methods known in the art, such as those disclosed in U.S. Pat. No. 5,707,471. Curing must be carried out at a temperature less than the temperature required for pyrolysis. Typically heating at 50 to 150° C. for about 2 minutes to 4 hours is sufficient. The method for heating is not critical.

One skilled in the art would know how to cure the composite shape.

Holes may be fabricated in the composite shape. The composite shape is pyrolyzed at a temperature between 1,000 and 1,300° C. to form a pyrolyzed composite. If the pyrolysis temperature is greater than 1,300° C., then the fibers may not retain their mechanical strength during processing. If the temperature is less than 1,000° C., pyrolysis will not be complete.

Typically, the composite formed by this method has open porosity of up to 30 vol %. "Open porosity" means void space inherent in the composite as-fabricated, but does not include void space of any holes fabricated in the CMC. The pyrolyzed composite may be reimpregnated with curable preceramic polymer and pyrolyzed to reduce open porosity. This reimpregnation and pyrolysis process may be repeated up to times to densify the CMC, until open porosity decreases to 2 to 20 vol %, preferably 5 to 15 vol % of the composite. If open porosity is more than 20 vol %, then mechanical strength of the CMC will be insufficient for some applications. At higher amounts of open porosity, dielectric constant is lower because more air, which has a dielectric constant of approximately 1, will be present in the composite. However, the mechanical strength of the CMC without holes fabricated therein will be optimal at about 15 vol % open porosity. Densification is deemed complete when open porosity is 2 to 5 vol %. The dielectric properties of a composite that is completely densified are typically a dielectric constant of 8 to 12 and a loss factor of 2 to 4.

The dielectric properties of the CMC can be further changed by fabricating a uniform array of holes therein and optionally filling the holes with an additive having dielectric properties different from the CMC as fabricated. By controlling the size, shape, and proximity of the holes, and the additives used in the CMC, it is possible to tailor properties of the CMC, such as mechanical strength, dielectric properties, and potential for oxidation. The holes may be formed during or after fabrication of the CMC. The holes scan range in diameter of 0.0254 to 0.318 cm When the holes are produced during fabrication of the composite, the CMC will have the advantage of greater structural capability and mechanical strength because the reinforcing fibers are not cut; they are displaced. A method for forming holes filled with an additive during fabrication of the CMC comprises forming a pre-preg around the additive to make the composite shape. The composite shape is then cured and pyrolyzed as described above. For example, the additive can be formed into a desired shape, such as rods, and thereafter placed in a die. The pre-preg can then be formed around the additive in the die.

Alternatively, the holes can be produced after fabrication of the CMC by a method such as diamond machining, laser machining, and ultrasonic machining. Producing the holes after fabrication allows for the CMC to be processed to a lower amount of open porosity than a CMC that will not have holes, without increasing dielectric constant. As the amount of open porosity decreases, the surface area of the composite that will be exposed to air decreases, and therefore, the potential for oxidation decreases. The CMC with holes formed after the CMC is fabricated has the advantage of lower oxidation potential.

Thereafter, the holes can be filled with an additive, as described previously, having dielectric constant different from that of the CMC as fabricated. The additive can be introduced into the holes by various methods, such as sol gel methods, slurry casting, glass frit melting, inserting solid rods of low dielectric constant material into the holes, or polymer derived methods. The additive can then be heated to a temperature of 1,000 to 1,300° C. to form a stable ceramic material filling the holes in the CMC.

The method of fabricating the CMC may further comprise an oxidation step after pyrolysis is complete (i.e., when open porosity is 2 to 20 vol %). The oxidation step comprises heating the CMC to a temperature of 800 to 1,000° C. for 10 to 40 hours in an oxidizing atmosphere. This forms a layer of an oxide material on the surface of the CMC. This layer protects the CMC from further oxidation when the CMC is used, for example, in an engine and also serves to reduce the dielectric constant and loss factor of the CMC through removal of residual carbon in the ceramic matrix.

EXAMPLES

These examples are intended to illustrate the invention to those skilled in the art and should not be interpreted as limiting the scope of the invention set forth in the claims.

"As-fabricated" as used in the examples, means that the CMC sample has been processed in an inert atmosphere until open porosity reached 2–20 vol %, but the sample as not yet been heated in an oxidizing environment and holes have not yet been fabricated.

Example 1

Four polymer impregnated and pyrolyzed ceramic matrix composite samples were fabricated using a borohydridopolysilazane resin in the matrix material and NICALON® fibers woven into a fabric. The fibers were coated with a two-layer interfacial coating comprising silicon nitride on top of boron nitride. Samples 1-1 and 1-3 contained 40 wt % silicon nitride filler in the ceramic matrix. Samples 1-2 and 1-4 contained 40 wt % silicon carbide filler in the ceramic matrix.

The method for preparing the samples was: prepregging, vacuum bagging, and autoclave processing and cure followed by a pyrolysis process at elevated temperature. A matrix mixture was made by combining the resin, the filler, and a solvent. The mixture was prepared by ball milling for 24 hours to provide adequate mixing and dispersion. The coated fabric was impregnated with the matrix mixture. The fabric was then air dried for 45 minutes to permit the solvent to evaporate. The fabric was then cut into the desired ply dimensions, stacked, and placed on a caul plate. The stack of plies on the caul plate were subjected to a vacuum and placed in an autoclave for compaction and cure. This was carried out by heating to a maximum temperature of 232° C. for 6 hours. After autoclaving, the resulting cured panel was pyrolyzed in a high temperature furnace at a maximum temperature of 1200° C. in an argon atmosphere for 6 hours. After pyrolysis, the resulting CMC samples had open porosity greater than 20 vol %. This porosity was reduced by carrying out a vacuum re-impregnation of the CMC with a solution of hydridopolysilazane resin in solvent. After re-impregnation, the CMC was pyrolyzed again in the high temperature furnace. This process was repeated until the desired level of open porosity was attained.

The dielectric constant and loss factor were measured at 10 GHz on the as-fabricated samples, 1-1 and 1-2. As-fabricated samples 1-3 and 1-4 were heated for an additional 40 hours at 1,000° C. in air to oxidize, and then dielectric constant and loss actor were measured. The results are in Table 1.

TABLE 1

Dielectric Properties Measured on Samples with Different Fillers

| | As-Fabricated | | After Oxidation | |
| --- | --- | --- | --- | --- |
| Sample # | 1-1 | 1-2 | 1-3 | 1-4 |
| Filler | Silicon Nitride | Silicon Carbide | Silicon Nitride | Silicon Carbide |
| Dielectric Constant | 8.7 | 12.0 | 7.1 | 9.37 |
| Loss Factor | 2.02 | 4.00 | 3.21 | 2.55 |

Example 2

Three CMC samples were fabricated using borohydridopolysilazane resin and silicon carbide filler in the matrix material, and silicon carbide (NICALON®) fibers. The fibers were coated with boron nitride interface coating. Sample 2-1 had no holes. Sample 2-2 was fabricated with 20% holes.

The method for preparing the samples was the same as that used in Example 1. Samples 2-1 and 2-2 were impregnated, cured, and pyrolyzed 15 times each. Thereafter, holes were drilled in sample 2-2 by ultrasonic machining (20 vol %). The holes had diameter of 0.18 cm. Sample 2-3 was impregnated, cured, and pyrolyzed 4 times.

Density, open porosity, dielectric constant and loss factor were measured for the as-fabricated samples. For sample 2-2, open porosity refers to the 7.21% open porosity for the material as-fabricated, not including the additional porosity provided by fabrication of 20 vol % holes therein. The results are in Table 2. Density is reported in units of g/cc.

TABLE 2

Comparison of Samples with and without Holes

| Sample # | Density | Open porosity (vol %) | Dielectric Constant | Loss Factor |
| --- | --- | --- | --- | --- |
| 2-1 | 2.209 | 6.279 | 10.43 | 7.296 |
| 2-2 | 2.190 | 7.21 | 6.211 | 2.961 |
| 2-3 | 2.015 | 15.789 | 8.896 | 1.829 |

Example 3

Sample 3 was prepared by the method for sample 2-2 in Example 2, except that after pyrolysis was complete and holes were machined, the holes in sample 3 were filled with glass. Dielectric constant and loss factor were measured as in Example 1. Sample 3 was then oxidized by heating to 1,000° C. for 10 hours in air. Dielectric constant and loss factor were measured as in example 1. Dielectric constant and loss factor were also measured on the glass used to fill the holes. The results are in Table 3.

TABLE 3

Comparison of Samples with Unfilled Holes and Holes Filled with Glass

| Sample | Density | Open Porosity | Dielectric Constant | Loss Factor |
| --- | --- | --- | --- | --- |
| Glass | 2.384 | 0.393 | 5.0 | 0.063 |
| 3 (before oxidation) | 2.212 | 7.059 | 12.0 | 13.0 |
| 3 (after oxidation) | 2.178 | 6.481 | 10.7 | 10.9 |

We claim:

1. A method for changing dielectric properties of a polymer impregnated and pyrolyzed matrix composite, wherein the method comprises fabricating a uniform array of holes having a diameter in the range of 0.0254 to 0.254 cm in the polymer impregnated and pyrolyzed ceramic matrix composite, which comprises a reinforcing fiber and a ceramic matrix.

2. The method of claim 1, wherein the holes are filled with an additive used to change the dielectric properties of the polymer impregnated and pyrolyzed ceramic matrix composite.

3. The method of claim 2, wherein the additive is selected from the group consisting of low dielectric constant materials and high dielectric constant materials.

4. The method of claim 3, wherein the additive is a low dielectric constant material having a dielectric constant in the range of about 1 to 7.5.

5. The method of claim 4, wherein the low dielectric constant material is selected from the group consisting of oxide and non-oxide materials.

6. The method of claim 5, wherein the oxide material is selected from the group consisting of silica and aluminosilicates.

7. The method of claim 5, wherein the non-oxide material is selected from the group consisting of silicon nitride, boron nitride, and silicon carbide.

8. A method for fabricating a polymer impregnated and pyrolyzed ceramic matrix composite, wherein the method comprises:

i) impregnating a reinforcing fiber with a matrix mixture comprising a curable preceramic polymer to form a pre-preg, ii) forming a composite shape from the pre-preg, iii) curing the composite shape, iv) pyrolyzing the composite shape in an inert atmosphere at a temperature of at least 1,000° C. to form a pyrolyzed composite comprising a reinforcing fiber and a ceramic matrix, and v) impregnating the pyrolyzed composite with the curable preceramic polymer, vi) pyrolyzing the pyrolyzed composite and curable preceramic polymer from step vi), vii) repeating steps v) and vi) until open porosity of the composite decreases to 2 to 20 vol % to form a polymer impregnated and pyrolyzed ceramic matrix composite; and viii) fabricating a uniform array of holes having a diameter in the range of 0.0254 to 0.254 cm in the polymer impregnated and pyrolyzed ceramic matrix composite.

9. The method of claim 8, wherein at least one additive used to change dielectric properties of the polymer impregnated and pyrolyzed ceramic matrix composite is incorporated therein.

10. The method of claim 9, wherein the additive is a filler, and it is incorporated in the polymer impregnated and pyrolyzed ceramic matrix composite by adding the filler to the matrix mixture before the reinforcing fibers are impregnated with the matrix mixture.

11. The method of claim 9, wherein the additive is incorporated in the polymer impregnated and pyrolyzed ceramic matrix composite by filling the holes with the additive.

12. The method of claim 11, wherein the additive is incorporated during fabrication of the polymer impregnated and pyrolyzed ceramic matrix composite before pyrolysis.

13. The method of claim 12, wherein the holes are fabricated and filled by forming the additive into a desired shape, placing the additive in a die, and forming the pre-preg around the additive.

14. The method of claim 9, wherein the additive is incorporated in the polymer impregnated and pyrolyzed ceramic matrix composite after pyrolysis by filling the holes with the additive.

15. The method of claim 14, wherein the holes are fabricated after pyrolysis by a method selected from the group consisting of diamond machining, laser machining, and ultrasonic machining.

16. The method of claim 15, wherein the additive is selected from the group consisting of low dielectric constant materials and high dielectric constant materials, and the additive is incorporated into the holes by a method selected from the group consisting of sol gel methods, slurry casting, glass frit melting, inserting solid rods of the additive into the holes, and polymer derived methods.

17. The method of claim 16, further comprising forming a stable ceramic material filling the holes by heating the polymer impregnated and pyrolyzed ceramic matrix composite to a temperature of 1,000 to 1,300° C. after the holes are filled.

18. The method of claim 8, wherein pyrolyzing is carried out by heating at a temperature of 1,000 to 1,300° C.

19. The method of claim 18, wherein the composite shape is cured by heating to a temperature less than the temperature at which the composite shape is pyrolyzed.

20. The method of claim 8, wherein the open porosity of the polymer impregnated and pyrolyzed ceramic matrix composite decreases to 5 to 15 vol %.

21. The method claim 8, further comprising heating the polymer impregnated and pyrolyzed ceramic matrix composite after pyrolysis to a temperature of 800 to 1,000° C. in an oxidizing atmosphere.

22. A method for changing the dielectric properties of a polymer impregnated and pyrolyzed ceramic matrix composite, wherein the method comprises fabricating a uniform array of holes having a diameter in the range of 0.0254 to 0.254 cm in the polymer impregnated and pyrolyzed ceramic composite, which comprises a reinforcing fiber, ceramic matrix and filler.

23. The method of claim 22, wherein the filler is a low dielectric constant material having a dielectric constant in the range of 4.0 to 7.5.

* * * * *